United States Patent
Leep et al.

[15] 3,688,181
[45] Aug. 29, 1972

[54] SATURABLE REACTOR

[72] Inventors: Vladimir Romanovich Leep, Chapaevsky pereulok, 14, kv. 121; Kharis Malikovich Sibgatulin, Beskudnikovsky bulvar, 32, korpus 4, kv. 56; Jury Nikolaevich Cherkasov, proezd Cherskogo, 9, kv. 35, all of Moscow, U.S.S.R.

[22] Filed: May 26, 1971

[21] Appl. No.: 146,999

[52] U.S. Cl..............323/43.5 S, 219/131, 323/89 A, 323/89 TC, 323/56
[51] Int. Cl...............................................H01f 29/02
[58] Field of Search.......307/88; 340/17 A; 317/148; 323/6, 43.5 R, 43.5 S, 89 C, 89 TC, 89 A, 56; 336/155; 219/131

[56] References Cited

UNITED STATES PATENTS

| | | | |
|---|---|---|---|
| 2,960,626 | 11/1960 | Mulder | 323/89 A |
| 3,051,889 | 8/1962 | Selin | 323/56 X |
| 3,323,039 | 5/1967 | Kusko | 323/45 |
| 3,541,428 | 11/1970 | Schwarz | 323/56 |

Primary Examiner—Gerald Goldberg
Attorney—Waters, Roditi, Schwartz & Nissen

[57] ABSTRACT

The present invention relates to means for the stabilization of load current, and more specifically to saturable reactors.

According to the invention, an unbiased saturable reactor is characterized in that its a.c. (gate) windings are connected in series with the load circuit which also contains a tap-changer which reduces the number of turns in the a.c. (gate) windings as the reactor changes from an excitation interval to a conduction interval and restores the original number of turns in these windings in the case of a reverse change.

2 Claims, 7 Drawing Figures

SATURABLE REACTOR

The present invention relates to load-current stabilizers, and more specifically, the saturable reactors.

In the prior art, there is an unbiased saturable reactor whose a.c. (gate) winding is series-connected with the load.

This prior-art saturable reactor suffers from the following disadvantages: considerable control power, heavy weight, large size, low speed of response, and low level of current stabilization at large power.

It is an object of the present invention to avoid the above-mentioned disadvantages.

The invention aims at providing a saturable reactor for current stabilization, having a speed or response increased by several orders of magnitude for the same control power or having the same speed of response for the control power reduced in the same proportion; a weight and size reduced by two or three orders of magnitude for the same load power, and having a stabilization level improved several times.

With this aim in view, the present invention resides in that an unbiased saturable reactor has a tap-changer connected in series with the load and serving to reduce the number of turns in a.c. (gate) windings as the reactors changes from an excitation interval to a conduction interval and to restore the original number of turns in said windings in the case of a reverse change.

It is preferable to make each a.c. (gate) winding of at least two sections differing in the number of turns, and to make the tap-changer with at least two controlled rectifiers connected in parallel opposition, between the gates of which are placed the sections having a greater number of turns, while the other sections are connected in series with the load and aiding with the sections having the greater number of turns.

The saturable reactor disclosed herein makes it possible to construct current stabilizers of practically unlimited power rating, having excellent characteristics in terms of volume, weight and speed of response. The simple circuit configuration of this saturable reactor ensures high reliability and simplicity of servicing, makes unnecessary any adjustment and alignment, and retains high quality of regulation and stabilization. It may have applications in arc welding, cutting and hardfacing, electrolysis, electroplating, etc.

The invention will be more fully understood from the following description of preferred embodiments when read in connection with the accompanying drawings wherein.

Figure 1:
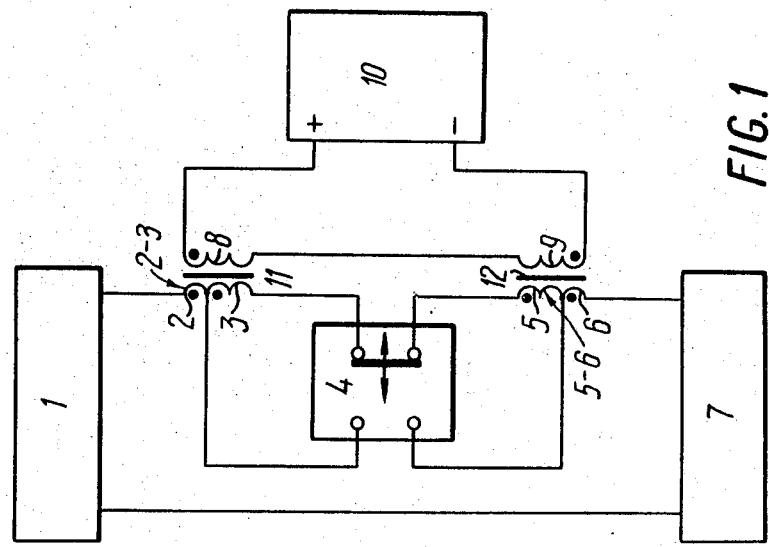
FIG. 1 is a circuit schematic diagram of a saturable reactor with switched a.c. (gate) windings, according to the invention.

Referring to FIG. 1, the voltage furnished by an a.c. supply source 1 is applied via an a.c. (gate) winding, 2–3, of a saturable reactor, a high-speed tap-changer 4, and another a.c. (gate) winding, 5–6, of the same saturable reactor to a load 7.

Each of the a.c. (gate) windings, 2–3 and 5–6, has sections 2 and 3, 5 and 6, respectively, such that the sections 2 and 6 have fewer turns, and the sections 3 and 5 have more turns. The windings 2–3 and 5–6 are connected aiding. The d.c. control windings 8 and 9 of the saturable reactor are connected in series opposition and to a d.c. source 10 so that the start of the winding 8 is applied to the positive side of the source 10. The windings 2–3 and 8 are wound on a core 11, and the winding 5–6 and 9, on a core 12.

Consider operation of the saturable reactor disclosed herein. During the time interval $t_0-t_1$ (FIG. 2), a positive half-cycle 13 of the voltage furnished by the supply source 1 (FIG. 1) is impressed on the windings 2–3 and 5–6 of the saturable reactor.

The tap-changer 4 is positioned so that the winding 2–3 and 5–6 wound on the cores 11 and 12, respectively, are connected in series with the load 7.

As a result, the load 7 is traversed by the no-load current of the saturable reactor. The whole of the voltage during the positive half-cycle 13 (FIG. 2) is applied to the windings 2–3 and 5–6 (FIG. 1) and brings about a change in the fluxes linking the cores 11 and 12. The windings 8 and 9 are energized with the control voltage from the supply source 10.

Figures 2, 3, 4:
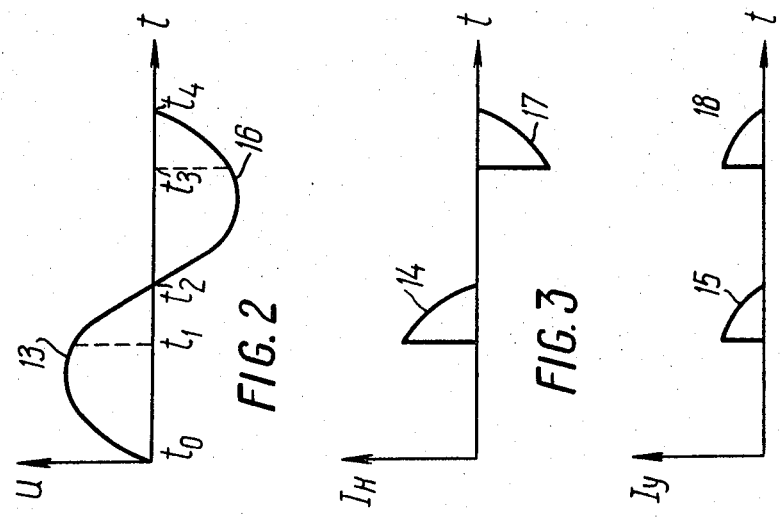
FIG. 2 is a plot of time waveforms of supply voltage.
FIG. 3 is a plot of time waveforms of load current.
FIG. 4 is a plot of time waveforms of control current.

At time $t_1$ (FIG. 2) the core 11 (FIG. 1) reaches saturation, and the current in the windings 2–3 and 5–6 suddenly rises to a value determined by the instantaneous value of the positive half-cycle 13 of voltage corresponding to this time $t_1$ and proportional to the impedance of the load 7 (FIG. 1). The tap-changer is caused by the load current to jump into a position such that the load current flows through the sections 2 and 6, in which it is maintained by the load current during a time interval $t_1 - t_2$. The core 12 is unsaturated. The load 7 is traversed by a load current such as illustrated by the waveform 14 (FIG. 3). The windings 8 and 9 (FIG. 1) are energized with a control current such as represented by the waveform 15 (FIG. 4).

The currents represented by the waveforms 14 and 15 continue until time $t_2$ (FIG. 2), At time $t_2$, the tap-changer 4 (FIG. 1) resets, because the current at that instant is zero, and the source 1 applies a negative half-cycle 16 of voltage (FIG. 2) to the windings 5–6 and 2–3.

During a time interval $t_2-t_3$ (FIG. 2), the magnetic flux linking the cores 11 and 12 reverses in sense, and the core 12 reaches saturation at time $t_3$. The tap-changer 4 switches the windings so that only the sections 6 and 2 are left in the load circuit. The load 7 and the sections 6 and 2 are traversed by a current of reverse polarity, such as represented by the waveform 17 (FIG. 3). The control windings 9 and 8 (FIG. 1) are energized with a control current such as represented by the waveform 18 (FIG. 4). At time $t_4$ (FIG. 2) the entire sequence of events just described is repeated all over again.

During the conduction $1 - t_{1-t2}$ and $t_3 - t_4$, provided the mean values of currents (as represented by the waveforms 14 and 17 in FIG. 3) are not equal to a predetermined control current, a change occurs in the constant residual flux of the cores 11 and 12, shifting the time instants $t_1$ or $t_3$ (corresponding to saturation) one way or the other along the time axis, while retaining the predetermined load current in a single-valued, multiple relation to the control current.

The load current $I_L$ is given by $$I_L = I_c (W_c/W_g),$$

where $I_L$ = load current (mean value);
$I_c$ = control current (mean value);
$W_c$ = number of turns in control winding 8 or 9;
$W_g$ = number of turns in a.c. (gate) winding 2–3 or 5–6.

During the excitation intervals $t_o$–$t_a$ and $t_2 - t_3$, the windings 2–3 and 5–6 of the saturable reactor take part in its operation, while during the conduction intervals $t_1$– $t_2$ and $t_3$– $t_4$ the same is true of only the sections 2 and 6 of the windings 2–3 and 5–6, respectively. The sections 3 and 5 3 much more turns than the sections 2 and 6. The voltage gain and speed of response of the saturable reactor are directly proportional to the number of turns in the windings 2–3 and 5–6, while its current gain is inversely proportional to the number of turns in the sections 2 and 6.

Both relationships are considered as related to the number of turns of the control windings 8 and 9.

As a result of the foregoing, the power gain of the saturable reactor can be increased $$\left(\frac{W_{g1}+W_{g2}}{W_{g1}}\right)^2$$

times as compared with case where an equal number of turns were maintained during the indicated time intervals, all other conditions being equal. Here, $W_{g1}$ is the number of turns in the section 2 or 6, and $W_{g2}$ in the section 3 or 5.

The time constant of a saturable reactor having switched gate windings is $1/(W_{g2}/W_{g1})$ of what it normally is, with the same power gain.

Figure 5:
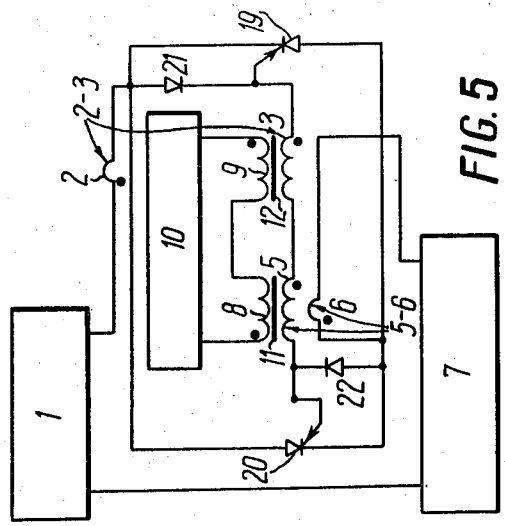

FIG. 5 shows an alternate embodiment of a saturable reactor with switched a.c. (gate) windings.

In contrast to the embodiment of FIG. 1, the sections 2 and 6 of the windings 2–3 and 5–6 (FIG. 5) are interconnected via controlled rectifiers 19 and 20, and the controlled rectifiers 19 and 20 themselves are connected in parallel opposition.

The sections 3 and 5 of the windings 2–3 and 5–6 are interconnected in series so that the start of the section 3 and the finish of the section 5 are connected to the gates of the controlled rectifiers 19 and 20, respectively, whose gate-cathode circuits are bypassed by diodes 21 and 22, respectively.

The saturable reactor of FIG. 5 operates as follows.

During the time interval $t_o$–$t_a$ (FIG. 2) the positive half-cycle 13 of voltage furnished by the source 1 (FIG. 1) is applied via the diode 21, the sections 3 and 5, the gate-cathode circuit of the rectifier 20, and the sections 6 and 2 to the load 7. This path running from the diode 21, through the sections 3 and 5, the gate-cathode circuit of the rectifier 20, the sections 6 and 2, and to the load 7, is traversed by the no-load current of the reactor, which is insufficient to drive the rectifier 20 into conduction. At time $t_1$ (FIG. 2) the core 11 is saturated, the current flowing in the sections 3 and 5 and across the gate junction of the rectifier 20 suddenly rises the latter changes to conduction, and the sections 3 and 5 are shunted (for a high level of current stabilization the sections 3 and 5 should have a high internal impedance). As a result, a load current, such as represented by the waveform 14 in FIG. 3, flows from the source 1, via the rectifier 20, the sections 6 and 2. This current flow will continue until time $t_2$ (FIG. 2). At time $t_2$ the polarity of the voltage furnished by the source 1 is reversed and the cores 11 and 12 (FIG. 5) are magnetized in the opposite sense by the negative half-cycle 16 (FIG. 2) of voltage from the source 1. At time $t_3$, the core 12 (FIG. 5) is saturated, the controlled rectifier 19 is driven to conduction, the sections 5 and 3 are shunted, and the load is traversed by a current in reverse polarity, corresponding to the waveform 17 of FIG. 3.

Figure 6:
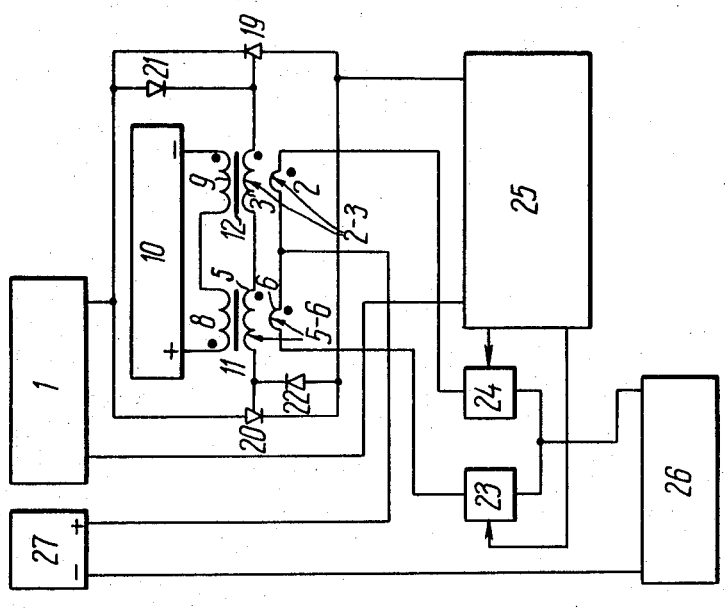
FIG. 5 and 6 show alternate embodiments of a saturable reactor with switched a.c. (gate) windings.

In contrast to the saturable reactor of FIG. 5, the saturable reactor shown in FIG. 6 comprises fully controlled high speed switches 23 and 24 (say, transistors), with the input supply coming from a control transformer 25. The load 26 is connected in series with the switches 23 and 24 and, via the sections 6 and 2, with a d.c. source 27.

The saturable reactor of FIG. 6 operates as follows.

Figure 7:
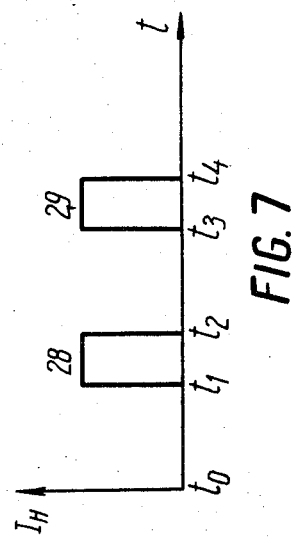
FIG. 7 is a plot of time waveforms of load current of the saturable reactor shown in FIG. 6.

The transformer 25 (FIG. 6) is loaded into the inputs of the controlled high-speed switches 23 and 24 such that the switch 23 (or 24) is conducting during the time interval $t_1$–$t_2$, and the switch 24 (or 23) is conducting during the time interval $t_3$–$t_4$. During these time intervals, the load 26 is traversed by a current, such as represented by the waveforms 28 and 29 of FIG. 7, and furnished by the source 27 via the sections 6 and 2.

In this case, the a.c. source is of low power rating and may be operated at a frequency higher than the commercial one.

What is claimed is:

1. An unbiased saturable reactor operating from an a.c. source, comprising: at least two a.c. (gate) windings each of which is series-connected with a load of the saturable reactor; a tap-changer connected in series with the load and serving to reduce the number of turns in said a.c. (gate) windings as the reactor changes from an excitation interval to a conduction interval and to restore the original number of turns in said windings in the case of a reverse change.

2. A saturable reactor, as in claim 1, in which each of said a.c. (gate) windings is made of at least two sections differing in number of turns, and said tap-changer comprises at least two controlled rectifiers connected in parallel opposition, between the gates of which are placed the sections of said windings having more turns, while the sections having fewer turns are connected in series with the load and aiding with the sections of said windings having more turns.

* * * * *

UNITED STATES PATENT OFFICE
CERTIFICATE OF CORRECTION

Patent No. 3,688,181  Dated August 29, 1972

Inventor(s) Vladimir Romanovich Lepp, et. al.

It is certified that error appears in the above-identified patent and that said Letters Patent are hereby corrected as shown below:

On the cover sheet [72] "Vladimir Romanovich Leep" should read -- Vladimir Romanovich Lepp -- .

Signed and sealed this 20th day of March 1973.

(SEAL)
Attest:

EDWARD M. FLETCHER, JR.
Attesting Officer

ROBERT GOTTSCHALK
Commissioner of Patents